US007030761B2

(12) United States Patent
Bridgelall et al.

(10) Patent No.: US 7,030,761 B2
(45) Date of Patent: Apr. 18, 2006

(54) MULTI-RESOLUTION OBJECT LOCATION SYSTEM AND METHOD

(75) Inventors: Raj Bridgelall, Mount Sinai, NY (US); Mark William Duron, East Patchogue, NY (US); Martin J. Strzelczyk, Farmingville, NY (US)

(73) Assignee: Symbol Technologies, Holtsville, NY (US)

( * ) Notice: Subject to any disclaimer, the term of this patent is extended or adjusted under 35 U.S.C. 154(b) by 190 days.

(21) Appl. No.: 10/803,186

(22) Filed: Mar. 16, 2004

(65) Prior Publication Data
US 2005/0206555 A1 Sep. 22, 2005

(51) Int. Cl.
*G08B 13/14* (2006.01)
(52) U.S. Cl. .............................. 340/572.2; 340/572.1; 340/538.11; 340/538.15
(58) Field of Classification Search ............. 340/572.1, 340/572.2, 572.4, 573.1, 573.3, 10.1, 538.11, 340/538.15, 539.13, 539.23; 342/127, 386; 701/301; 235/380
See application file for complete search history.

(56) References Cited

U.S. PATENT DOCUMENTS

| 6,259,991 | B1 * | 7/2001 | Nysen ........................ 701/300 |
| 6,356,230 | B1 | 3/2002 | Greef et al. ................. 342/127 |
| 6,414,626 | B1 | 7/2002 | Greef et al. ................. 342/127 |
| 6,842,121 | B1 * | 1/2005 | Tuttle ....................... 340/693.9 |
| 6,853,294 | B1 * | 2/2005 | Ramamurthy et al. ..... 340/10.1 |
| 6,868,073 | B1 * | 3/2005 | Carrender ................... 370/278 |
| 2002/0008143 | A1 | 1/2002 | Bridgelall |
| 2003/0232598 | A1 | 12/2003 | Aljadeff et al. |

FOREIGN PATENT DOCUMENTS

| EP | 1239634 A | 9/2002 |
| WO | WO 03/016940 A | 2/2003 |

* cited by examiner

*Primary Examiner*—Van T. Trieu
(74) *Attorney, Agent, or Firm*—Ingrassia Fisher & Lorenz

(57) ABSTRACT

A multi-resolution object location system and method for locating objects is provided. The multi-resolution system and method uses a long-range object locator together with a more precise RFID locator to efficiently and accurately determine the location of objects that include an RFID tag. The long-range object locator has a relatively longer range and can cover a relatively large area to determine the general location of the object within the large area. The RFID locator has a relatively shorter range, but is able to locate the object more precisely. The object location system uses the long-range locator to first determine the general location of the object, and then the RFID locator is used to determine a more accurate location of the object. Thus, the multi-resolution object location system is able to provide both a long range location of objects over a large area and a precise location of objects.

50 Claims, 10 Drawing Sheets

| FUND FREQ (MHz) | RELATIVE PHASE UNWRAPPED (RADIANS) |
|---|---|
| 902 | 0.113234896 |
| 904 | 1.294354711 |
| 906 | 4.975474525 |
| 908 | 5.25659434 |
| 910 | 6.937714155 |
| 912 | 10.41883397 |
| 914 | 10.49995378 |
| 916 | 10.7810736 |
| 918 | 12.06219341 |
| 920 | 12.543331323 |
| 922 | 15.52443304 |
| 924 | 18.40555286 |
| 926 | 19.18667267 |
| 928 | 20.86779249 |

| FUND FREQ (MHz) | RELATIVE PHASE MEASUREMENT (RADIANS) |
|---|---|
| 912 | 4.135648662 |
| 922 | 2.958062428 |
| 910 | 0.654528847 |
| 904 | 1.294354711 |
| 926 | 0.337711675 |
| 918 | 5.779008106 |
| 908 | 5.25659434 |
| 906 | 4.975474525 |
| 924 | 5.839182243 |
| 902 | 0.113234896 |
| 914 | 4.216768477 |
| 920 | 6.26012792 |
| 928 | 2.018236565 |
| 916 | 4.497888291 |

800 ⤴

FIG. 9 ns. In response, the RFID tag backscatter modulates the plurality of transmitted signals to create a plurality of backscatter-modulated signals. The RFID reader receives and demodulates the plurality of backscatter-modulated signals. The distance calculator determines the phase of the plurality of backscatter-modulated signals and determines a rate of change of the phase in the backscatter-modulated signals with respect to the rate of change in the fundamental frequency of the transmitted signals and uses this information to calculate the distance to the RFID tag. Using the same technique the distance from multiple RFID readers can be calculated. Using the distances to the multiple of RFID readers and the known location of the readers, an accurate location can be determined using trilateration techniques.

MULTI-RESOLUTION OBJECT LOCATION SYSTEM AND METHOD

FIELD OF THE INVENTION

This invention generally relates to object location systems, and more specifically relates to multi-resolution object location systems and radio frequency identification (RFID).

BACKGROUND OF THE INVENTION

In modern supply management systems there is a growing need for the ability to locate and track a wide variety of objects. This can include the locating and tracking of objects over wide areas, such as large factories and distribution centers.

Unfortunately, previous attempts creating such a system have failed to provide the accuracy and reliability desirable for such a system. For example, previous systems have relied upon exceedingly complex battery powered devices with high per-unit costs and limited battery life. The cost and accuracy limitations of these previous methods have prevented their adoption in applications that needed to provide the ability to track and locate large numbers of objects at a relatively low per-unit cost.

Accordingly, it is desirable to provide an improved method for locating objects. In addition, it is desirable to provide an improved system for locating objects. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

The present invention provides a multi-resolution object location system and method for locating objects. The multi-resolution system and method uses a long-range object locator together with a more precise RFID locator to efficiently and accurately determine the location of objects that include an RFID tag. The long-range object locator has a relatively longer range and can cover a relatively large area to determine the general location of the object within the relatively large area. The RFID locator has a relatively shorter range, but is able to locate the object more precisely. The object location system uses the long-range locator to first determine the general location of the object, and then the RFID locator is used to determine a more accurate location of the object. Thus, the multi-resolution object location system is able to provide both a long range location of objects over a large area and a precise location of objects. The multi-resolution object location system and method can thus efficiently provide accurate object location over a large area. The multi-resolution object location system and method can be used on a variety of different types of objects, including inventory and equipment. The system and method can also be used to locate people, for example, in areas where security concerns require tracking of individuals.

The long-range object locator can be implemented to determine the general location of the object using a variety of techniques. With the general location determined, the RFID locator provides accurate object location using backscatter-modulated signals from an RFID tag. Specifically, the RFID locator includes at least one RFID reader that transmits a plurality of signals to the RFID tag, with the plurality of signals having different fundamental frequen- Thus, the multi-resolution object location system is able to provide both a long range location of objects and a precise location of objects. Additionally, the multi-resolution object location system and method can reduce the time required to locate objects and minimize interference by not requiring that all RFID readers in an area be used determine object location. Specifically, determining the general location first minimizes the number of RFID readers that must be used to precisely locate an object, and thus reduces the number of transmissions from RFID readers. This reduces the probability of interference between RFID readers and can also reduce bandwidth and other networking requirements for communicating to the RFID readers. Second, the system and method is able to locate an object relatively quickly as compared to a system that attempts to minimize interference by serially allocating different time periods to different RFID readers. Finally, this system can at least generally locate objects even when they are unable to be located by the RFID readers, such as in the case of a reader failure, or in the case of object location being out of range of all RFID readers. The multi-resolution object location system and method can thus efficiently provide accurate object location over a relatively large area.

BRIEF DESCRIPTION OF DRAWINGS

The preferred exemplary embodiment of the present invention will hereinafter be described in conjunction with the appended drawings, where like designations denote like elements, and:

FIGS. 9 and 10 are table views of an exemplary data set in accordance with an exemplary embodiment of the present invention.

DETAILED DESCRIPTION OF THE INVENTION

Figure 2:
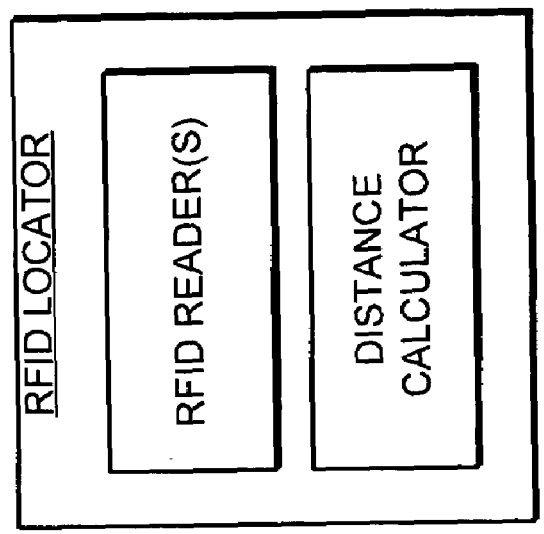
FIG. 2 is a schematic view of an RFID locator in accordance with an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Generally, the present invention provides a system and method for locating objects that uses both a long range locator to determine the general location and uses Radio Frequency Identification (RFID) tags for more accurate object location. Specifically, the system and method uses the long range locator to determine the general location and then uses the phase of backscatter-modulated signals from the RFID tags with respect to the fundamental frequency of the transmitted signals to efficiently and accurately determine the location of objects. The long range locator and RFID locator can be implemented as mobile units, or implemented within the infrastructure of a facility, or as combination of both.

RFID is a technology that incorporates the use of electromagnetic or electrostatic coupling in the radio frequency spectrum to identify objects to which RFID tags are affixed. RFID systems in general provide the advantage of not requiring direct contact or line-of-sight scanning. A typical RFID system includes an RFID reader and a plurality of RFID tags that are affixed to the objects of interest. The RFID reader includes an antenna and also includes or is coupled to a transceiver. The RFID reader uses the antenna and transceiver to transmit radio frequency signals to the RFID tag. The RFID reader has the ability to select one or more tags by transmitting an identifier that specifies one or more of the tags from a plurality of tags. When an RFID reader selects an RFID tag, the RFID tag is put into a responsive mode, with other tags going into a muted state.

When put into responsive mode, the tag transmits data back to the reader by modulating a backscattered signal that is received at the RFID reader antenna. As one example, some tags use variable impedance coupled to the antenna that can be used to change the amount of energy that is reflected back by the tag. These tags can transmit data to the reader by selectively varying the impedance to modulate the backscattered signals. Similarly, these tags can be put into a "muted" or non-responsive state by selecting and maintaining an impedance value that minimizes the backscattering from that tag.

Thus, an RFID reader can be used to select one or more RFID tags and retrieve data from the selected tags. As such, RFID tags can be used to identify and track large numbers or objects. Furthermore, because RFID tags have a relatively low per-unit cost, they have the ability to track large numbers of objects at relatively low costs.

RFID tags are used in a variety of commercial contexts that require a unique identification system for large numbers of items. As examples, RFID tags are used in everything from department store inventory and checkout systems to the tracking of military supplies. RFID systems are often preferred for object identification due to their increased range, lack of a line of sight requirement between a tag and its reader, and high multi-tag throughput.

RFID tags are available in a variety of configurations, shapes and sizes. For example, different tags for different applications typically have a shape and size appropriate for its application. RFID tags are commonly categorized as active, passive or semi-passive. Active RFID tags include an internal battery used to transmit data and typically include the ability to read and write greater amounts of stored data than either passive or semi-passive tags. Passive RFID tags transmit by reflecting and absorbing energy from the RF transmissions from the reader, and use absorbed energy from the reader for data storage, retrieval, and manipulation. Semi-passive tags include an internal battery that is used for data storage, retrieval, and manipulation, and transmit data by reflecting and absorbing energy from the reader.

Passive and semi-passive tags are typically lighter and less expensive than active tags. Passive tags offer a virtually unlimited operational lifetime because they do not require a battery for operation. The trade off is that they typically have a shorter read range than active tags, and require a higher output power from the reader. It is important to note that governmental restrictions in many jurisdictions restrict reader output power to ensure safety and to minimize interference between devices that must share frequency bands.

Passive and semi-passive tags include both read-only tags that are programmable once with a unique set of data that cannot be later modified, and read/writeable tags that can be rewritten one or more times using a suitable RFID writing device.

As will be described in greater detail below, another type of RFID tag are multi-mode tags. Multi-mode tags can operate using more than one mode. For example, some multi-mode tags can operate as both passive or semi-passive tags depending on individual needs. Other multi-mode tags can operate as passive, semi-passive or active tags. Furthermore, some multi-mode tags can communicate using a variety of protocols, 802.11x (where 802.11x is defined to include any of the various 802.11 protocols) or Bluetooth specifications.

RFID systems can use a variety of techniques to transmit data to and from the tag. For transmission to the tag, the data can be transmitted using any of a variety of modulation techniques, including amplitude modulation (AM), phase modulation (PM), and frequency modulation (FM). Furthermore, the data transmitted to the tag can be encoded using any of a variety of techniques, including frequency shift keying (FSK), pulse position modulation (PPM), pulse duration modulation (PDM), and amplitude shift keying (ASK).

As discussed above, passive and semi-passive tags transmit by selectively reflecting and absorbing energy from the reader, in a process generally referred to as backscatter modulation. Again, in backscatter modulation, the data can be encoded using a variety of techniques. For example, the data can be encoded using FSK, where the tag absorb-reflects at one rate to represent a first state (e.g., "one") and at another rate to represent a second state (e.g., "zero"). As another example, the data can be encoded using ASK, where the tag absorb-reflects at one rate for some duration to represent a first state (e.g., "one") and ceases backscatter modulation for another duration to represent a second state (e.g., "zero"). RFID systems also typically use a variety of different frequency ranges, including 30 KHz–500 KHz, 850

MHz–950 MHz and 2.4 GHz–2.5 GHz, depending on the regulatory spectrum allocations and performance requirements matched to various application requirements. For example, lower frequency systems typically provide better electromagnetic penetration through water while higher frequency systems do not. Lower frequency passive systems commonly operate within a few inches with small reader antennas while higher frequency systems commonly operate within several feet with similarly sized antennas. Also, lower frequency regulatory allocations are generally more widespread worldwide and typically allow more output power for passive tags than do higher frequency systems. However, where higher frequency spectrum is available for RFID, such as within FCC regulated domains, the output power is substantial and allows for robust long-range performance.

Figure 1:
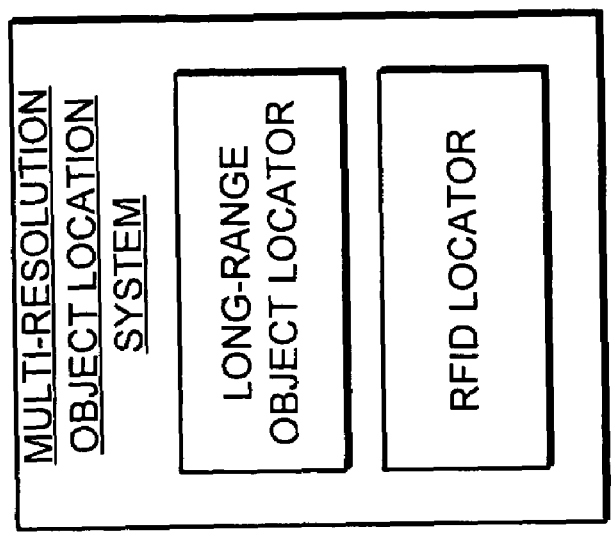
FIG. 1 is a schematic view of a multi-resolution object location system in accordance with an exemplary embodiment of the present invention.

The present invention provides a multi-resolution object location system and method for locating objects. Turning now to FIG. 1, an object location system 100 includes a long-range object locator together with a more precise RFID locator to efficiently and accurately determine the location of objects that include an RFID tag. The long-range object locator has a relatively longer range and can cover a relatively large area to determine the general location of the object within a relatively large area. The RFID locator has a relatively shorter range, but is able to locate the object more precisely. The object location system uses the long-range locator to first determine the general location of the object, and then uses the RFID locator determine a more accurate location of the object. Thus, the multi-resolution object location system is able to provide both a long range location of objects over a large area and a precise location of objects. The multi-resolution object location system and method can thus efficiently provide accurate object location over a large area.

The long-range object locator can be implemented to determine the general location of the object using a variety of techniques. For example, the long-range object locator can use techniques such a received signal strength indication (RSSI), time difference of arrival (TDOA) and angle of arrival (AOA) of transmitted signals. Such a method can determine a general location of an object and can cover a relatively large area. For example, a the long-range object locator can quantify the general location of the object to within 15 and 50 feet with varying degrees of certainty depending on multi-path conditions of the environment.

With the general location determined, the RFID locator provides accurate object location using backscatter-modulated signals from an RFID tag. Turning now to FIG. 2, a schematic view of an RFID locator 200 is illustrated in accordance with an exemplary embodiment of the present invention. The RFID locator 200 includes at least one RFID reader and a distance calculator. The RFID reader transmits a plurality of signals to the RFID tag on the object that is to be located. The plurality of signals transmitted to the RFID tag are selected to have different fundamental frequencies. In response to the transmitted signals, the RFID tag modulates the plurality of transmitted signals to create a plurality of backscatter-modulated signals. The RFID reader receives and demodulates the plurality of backscatter-modulated signals. The distance calculator determines the phase in the plurality of backscatter-modulated signals that were received by the RFID reader. From this, the distance calculator determines the rate of change of the phase in the backscatter-modulated signals versus the rate of change in the fundamental frequency of the transmitted signals and uses this information to calculate the distance to the RFID tag.

In one exemplary embodiment, an array of RFID readers is used to determine the object location. In this embodiment, each of the RFID readers transmits a plurality of signals to the RFID tag, with the signals from each RFID reader having different fundamental frequencies. In response, the RFID tag backscatter modulates the plurality of transmitted signals to create a plurality of backscatter-modulated signals that are received by the array of RFID readers. The distance calculator determines the phase of the plurality of backscatter-modulated signals. From this, the distance calculator determines the rate of change of the phase in the backscatter-modulated signals with respect to the rate of change in the fundamental frequency of the transmitted signals and uses this information to calculate the distance to the RFID tag. Using the distances to the array of RFID readers and the known location of the readers, a highly accurate location can be determined using trilateration. Thus, the system and method is able to efficiently determine a highly accurate location for objects that include an RFID tag.

The multi-resolution object location system and method can reduce the time required to locate objects and minimize interference by not requiring that all RFID readers in an area be used determine object location. Specifically, determining the general location first minimizes the number of RFID readers in the array that must be used to locate an object, and thus reduces the number of transmissions from RFID readers. This reduces the probability of interference between RFID readers and can also reduce bandwidth and other networking requirements for communicating to the RFID readers.

It should be noted that the distance calculator could be implemented in variety of ways. For example, the distance calculator can be fully implemented as part of each RFID reader. In another implementation, the distance calculator can be implemented at a central location, with the phase and fundamental frequency data used to calculate the distance transmitted to the central computer using any suitable networking technology. Finally, the distance calculator can be implemented partially in the reader, and partially at a central location. For example, the phase determinations can be made at each reader, with the final distance and location calculations made at central computer system linked to the readers.

As stated above, the plurality of signals transmitted to the RFID tag are selected to have different fundamental frequencies. To have a plurality of signals selected to have different fundamental frequencies there need only be at least one transmitted signal with a fundamental frequency different from at least one other transmitted signal. In general additional signals with additional different fundamental frequencies provides for increased accuracy of the distance calculation. However, it should be noted that nothing prevents the utilization of additional transmitted signals that have the same frequency as other transmitted signals. Phase measurements taken with transmitted signals having the same fundamental frequency as other transmitted signals can be combined with the other phase measurements to generate a more accurate overall calculation of the phase versus frequency rate of the change.

Figure 3:
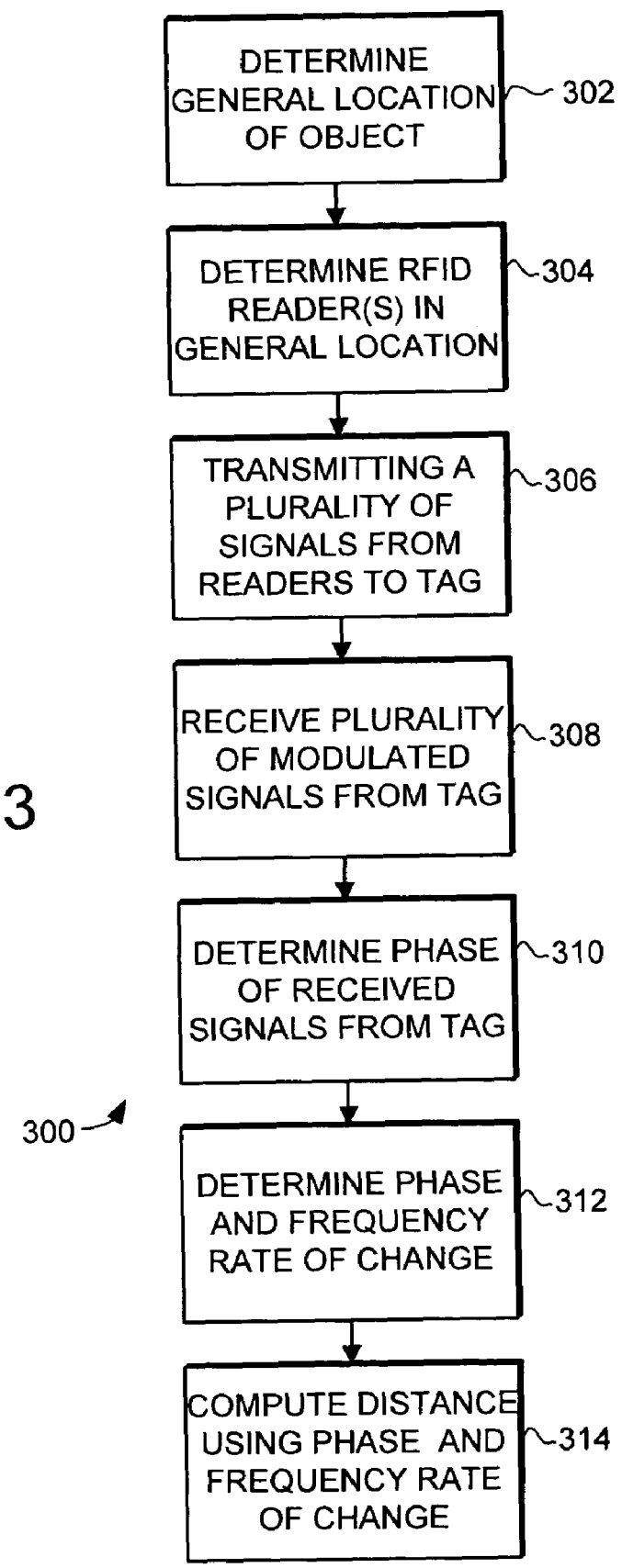
FIG. 3 is a flow diagram of a method for locating an object in accordance with an exemplary embodiment of the present invention.

Turning now to FIG. 3, a method 300 for locating an object is illustrated in accordance with an exemplary embodiment of the present invention. In the first step 302, the general location of the object is determined. The general location of the object can be determined using a variety of techniques that have relatively long range. For example, the general location can be determined using the received signal strength indication (RSSI), time-difference of arrival (TDOA) and angle or arrival (AOA) of transmitted signals. To facilitate this, an identifier capable of producing and/or receiving signals of these types is affixed to the object. As one example, a multi-mode RFID tag can be used, which is described in greater detail below.

With the general location of the object determined, the steps 304–314 more accurately locate the object using backscatter-modulation of signals from an RFID tag affixed to the object. Specifically, the next step 304 is to determine RFID reader(s) that are in the general location of the object. These RFID readers are those that are likely to be in range of the object for RFID transmission and backscatter. Generally, this will include a plurality of RFID readers in the general location, including both fixed and mobile RFID readers. In some embodiments however, a single RFID reader could instead be used.

The next step 306 is to transmit a plurality of signals from the RFID readers to the tag, with the signals transmitted having a different fundamental frequency. This will typically include addressing the RFID tag. When an RFID tag is addressed, it is put into a responsive mode where it will modulate and backscatter the received signals from the reader. Other tags within range of the reader that are not addressed will typically go into a muted state, where their reflections are intentionally minimized. Thus, the RFID readers are able to select one out of many different tags and receive backscatter-modulated signals only from the selected RFID tag.

To provide a suitable plurality of transmitted signals there needs only be at least one transmitted signal with a fundamental frequency different from at least one other transmitted signal, and additional transmitted signals can have duplicate frequencies. Furthermore, a "fundamental frequency" of a signal, as the term is used in this application, comprises one or more of the primary frequency components in the signal. For example, the fundamental frequency of a signal can be the frequency of the carrier signal without harmonics. It should be noted that the transmitted signal is not necessarily purely sinusoidal and thus may in fact carry harmonics due to the need for pulse shaping at the receivers.

The plurality of transmitted signals are received by the RFID tag. In response to these signals, the selected RFID tag backscatter modulates the plurality of transmitted signals to create a plurality of backscatter-modulated signals. The RFID reader receives and demodulates the plurality of backscatter-modulated signals. Because of the fundamental frequency difference in the originally transmitted signal, each of the plurality of backscatter-modulated signals received back at the reader will have a distinct relative phase.

In step 308, the plurality of modulated signals are received back at the RFID reader. The next step 310 is to determine the phase for the plurality of modulated signals. The phase of the received signals can be determined in variety of ways, such as channel demodulation. Such a method will be described in greater detail below.

The next step 312 is to determine the rate of change of the phase with respect to the rate of change of the fundamental frequency. The rate of change of the phase with respect to the rate of change of the fundamental frequency can be calculated from the plurality of phase measurements and plurality of transmitted signal fundamental frequencies using a variety of different techniques. For example, in one application, the rate of change of phase with respect to fundamental frequency is determined by performing a linear trend fit of phase measurements and corresponding fundamental frequency values. The linear trend fit is then used to generate a more accurate rate of change or "estimated slope" of phase and frequency.

It should be noted that in some applications steps 306–312 would be repeatedly continued with more transmissions and phase measurements until the rate of the change could be calculated within a specified level of accuracy. For example, the steps 306–312 can be continued until the linear trend fit generates an estimated slope that is within a desired confidence level, where the confidence level can be calculated using any suitable technique such as "goodness of fit" or any other method of assessing the variance of the data trend from a straight line.

The next step 314 is to determine the distance between the RFID reader and the RFID tag using the rate of change of the phase of the received signal with respect to the rate of change of the fundamental frequency of the transmitted signal. As will be explained in greater detail later, the distance (D) between the RFID reader and the RFID tag can be calculated as:

$$D = \frac{\Delta \phi}{\Delta f} \frac{c}{4\pi}. \qquad (1)$$

Where $\Delta \phi$ is the change in phase of the backscatter-modulated signals, $\Delta f$ is the change in fundamental frequency of the transmitted signals, and c is the speed of light in meters per second or feet per second depending on the desirable units of the distance measurement. Thus, the distance can be calculated using the rate of change in the phase ($\Delta \phi$) of the backscatter-modulated signals versus the rate of change in the fundamental frequency ($\Delta f$) of the transmitted signals.

As stated above, the method 300 can be applied with an array of RFID readers to more completely determine the object location. In this embodiment, each of the RFID readers performs steps 306 and 308, and the distance to each RFID reader is calculated in using the phase for the backscatter-modulated signals received at that RFID reader and the fundamental frequencies for the originally transmitted signals. Using the distances to at least three RFID readers and the known location of those readers, a highly accurate location can be determined using trilateration techniques. Thus, the method 300 is able to efficiently determine a highly accurate location for objects that include an RFID tag.

In these multi-reader applications, steps 306 and 308 will typically be performed on a reader-by-reader basis. For example, the plurality of signals will be transmitted and received by a first reader, and a plurality of signals then transmitted and received by a second reader and so on. This provides the advantage of minimizing interferences that could result from multiple concurrent transmissions from multiple readers. Additionally, because the general location of the object was determined in step 302 the RFID readers within range of the general location can be used to be transmit signals, while other RFID readers are not used, thus minimizing the amount of unproductive transmissions that can cause interference and increase the time needed to locate the object.

The system and method illustrated in FIGS. 1, 2 and 3 can cover a large area and also provide a high accuracy of object location. For example, long range locators can be implemented to cover large buildings using RSSI of WLAN signals. The RFID locator can then locate the objects more accurately. For example, an RFID system that uses 900 MHz fundamental frequencies can calculate the distance to within a theoretical value of 6 cm when the signal to noise ratio is relatively high. Also, because the system and method can use relatively inexpensive passive, semi-passive, active or multi-mode RFID tags, the system and method can be applied to a high number of objects at a relatively low per-unit cost.

As stated above, a variety of techniques can be used to provide long range location of the objects. In general, it is desirable to provide a system and method that is able to facilitate relatively long range location in an efficient and cost effective manner. Some techniques are passive, meaning that standard signals can be used with standard protocols to determine location. These systems typically work by listening and extracting information transmitted from compliant transmitter on the object. In some cases the signals are received by a plurality of receivers, fixed or mobile, and trilateration or triangulation is applied to locate the object. The receivers performing the location tracking can be implemented as network appliances or integrated within access points.

Several different passive methods and procedures can be used including, received signal strength indication (RSSI), time difference of arrival (TDOA) and angle or arrival (AOA). These various methods can be implemented using signals based on a variety of different protocols, including WLAN infrastructures such as those based 802.11x and other wireless networks such as Bluetooth based networks. In all of these cases, the transmitted network signals can be used to generally locate an object using a suitable technique.

As one example, RSSI is a technique that can be used to determine the location of an object. In RSSI, the relative signal strength of received signals is used to determine distance. Specifically, RSSI uses the strength of received signals and an estimation of the dependence between distance and received signal strength to determine the distance between a transmitting object and a receiver. The signal strength is measured at one or more receivers and those signal strengths are used to calculate the distance between the object and the receiver(s). The signal strength can be measured using a variety of different techniques and devices. The distance from multiple receivers can be used to determine the general location of the object using trilateration based on the known location of the receivers and the distances calculated between receivers and the object.

As another example, TDOA is another technique that can be used to determine location of an object. In TDOA, the time of signal arrival is measured at different receivers and compared. Based on the difference of time of arrival, the general location of the object transmitting the signal can be calculated. Specifically, the receiver closest to the object will hear the transmission first while the farthest receiver will hear it last. Between any two receivers, the time difference of arrival can be converted to a corresponding difference in distance. Calculating the difference in distance between two receivers forms a curve called a hyperbola that indicates all possible transmitter locations. Using a third receiver to generate a different hyperbola and calculating the intersection point of the hyperbola results in a location estimate for the object. This method, generally called hyperbolic trilateration can be used to determine the general location of objects over a relatively large area.

TDOA typically requires extremely accurate timing and synchronization to determine location. A variety of different methods can be used to provide this timing and synchronization, including the use of beacon transmitters of known location that periodically transmit synchronization code. By knowing the location of the beacon with respect to the receivers, clock offsets and phase delays through each receiver can be accounted for.

As a third example, AOA is another technique that can be used to determine the general location of an object. In AOA, the angle of arrival for signals arriving at different receivers is determined and compared. The angle can be calculated using different techniques, such as with an array of antennas. Given angle of arrival measurements from at least two receivers at known locations, an estimate of location can be calculated. Based on these different angles, the general location of the object transmitting the signals can be calculated.

RSSI, TDOA and AOA are thus examples of the type of passive methods that can be used to determine the general location of the object. With the general location determined, a more accurate location can be determined using RFID locater.

In addition to passive methods, several active methods can also be used. Active methods are generally those in which the identifier on the object has an active role in the location process, and thus typically requires that the identifier affixed to the object have specialized hardware/software in addition to the standard implementations. Examples of active methods include ranging and GPS based methods.

In ranging methods, the distance between an identifier and receivers is calculated by measuring the amount of time it takes for a signal to propagate from the mobile unit to the receiver. Measuring the propagation delay generally requires the receiver to know the absolute time the signal was transmitted and received. Alternative methods can have the receiver retransmit the message to the object and measure the round trip time. In all these cases, the transmission time is used to determine distance, and distance measurements to different receivers can be used to determine the object location.

Other methods that can be used over very large areas are wide-area cellular telephony systems and GPS based systems. Systems based on these devices can locate objects over an extremely large area but are likewise limited to a very coarse location determination. For example, typical GPS based systems are limited to an accuracy of only 50 feet. GPS systems have the additional disadvantage of limited penetration into buildings, and thus are only effective in outdoor settings.

In general, to locate objects using multi-resolution object location system and method RFID tags are affixed on or near the objects. The RFID tags facilitate the accurate location determination by backscatter-modulating signals from at least one RFID reader. To facilitate general location determination, it is also desirable to include an identifier compatible with the long range location procedure being used. For example, if RSSI of WLAN signals is used to determine the general location of the object, then an identifier is affixed at or near the object that can transmit and/or receive the WLAN signals upon which the RSSI distance calculation is made. Likewise, if TDOA of 802.11x signals is used to determine the general location of the object, then an identifier is affixed at or near the object that can transmit and/or receive the 802.11x signals upon which the TDOA distance calculation is made. These identifiers can be any suitable device capable of transmitting and/or receiving the suitable signals that are used to determine the general location of the object. Examples include various transceivers that can receive and transmit suitable signals for general object locations.

One specific example of the type of identifier that can be used to generally locate an object is a multi-mode RFID tag. A multi-mode RFID tag is an RFID tag that is able to transmit or receive in a mode additional to backscatter-modulation. For example, one type of multi-mode tag can communicate using 802.11x protocols in addition to RFID backscatter modulation. Another type of multi-mode tag can communicate using Bluetooth protocols in addition to RFID backscatter modulation. Other examples can include multiple different communication protocols including various wireless local area network (WLAN) protocols, 802.11x, Bluetooth, wireless wide area network (WWAN) protocols, global positioning system (GPS), and such.

Multi-mode tags can provide the ability for both general object location and more accurate object location. For example, a multi-mode tag with the ability to communicate using 802.11x and by backscatter-modulation can provide the long range signals needed for general object location and also backscatter-modulate the RFID signals to provide the more accurate object location. Using multi-mode tags in this way simplifies multi-resolution object location by eliminating the need for separate identifying devices for general and accurate object location.

In one embodiment, a multi-mode tag would be able to operate in several active, passive, and semi-passive modes. For example, in the active modes that tag can communicate using the 802.11x protocols. The tag would also be able to operate as a passive or semi-passive tag and communicate with backscatter-modulation when appropriate. For example, when being activated by and RFID reader. Such a multi-mode tag could also act as a passive tag to facilitate read/write activities even when the battery is depleted. Finally, the tag can operate in a semi-passive mode with battery powered processing and low backscatter-modulation used for communication. In other embodiments, the multi-mode tag would use GPS and/or WWAN as other active modes that can be used for general area location of the object.

Figure 4:
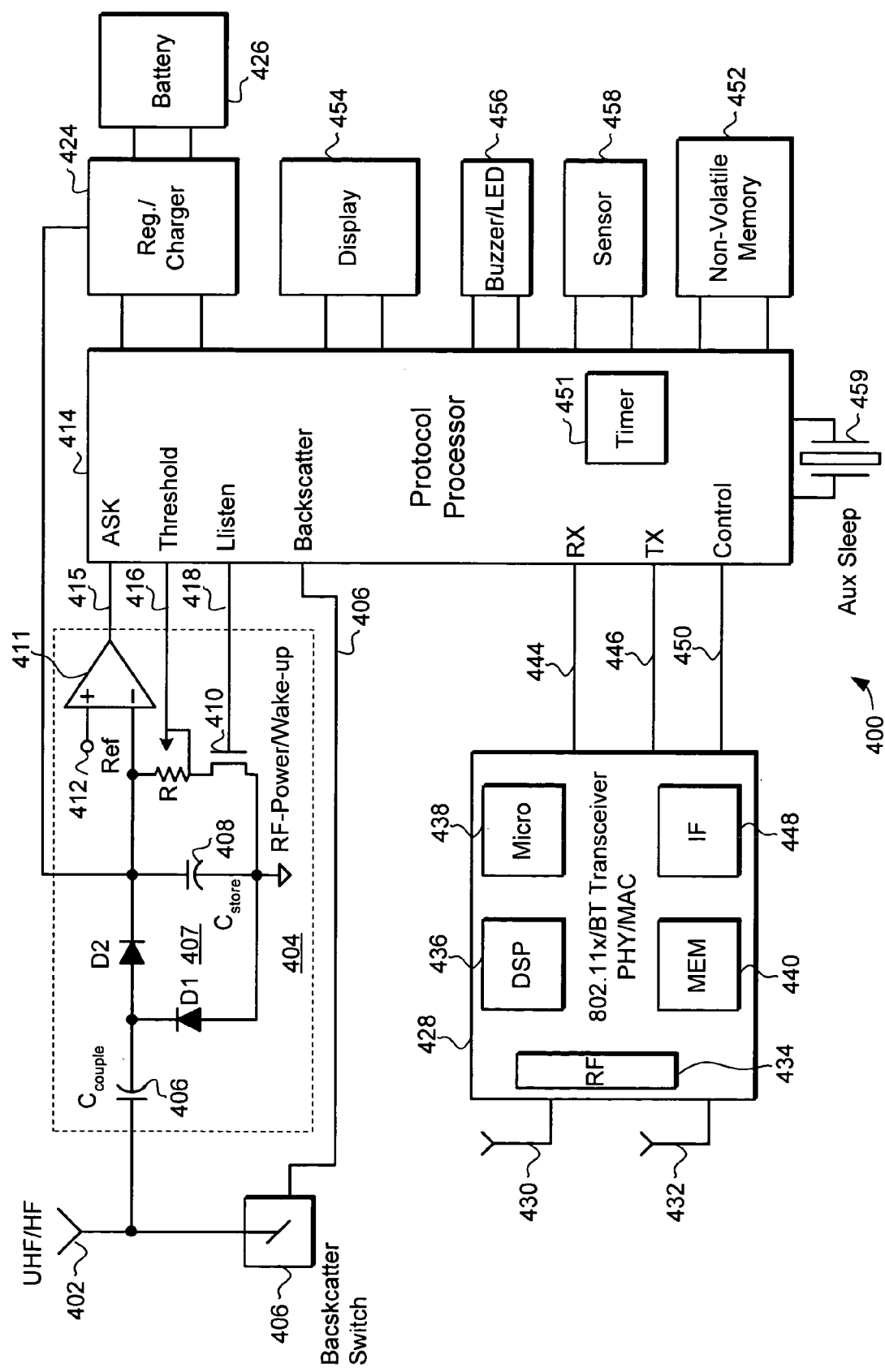
FIG. 4 is a schematic diagram a multi-mode RFID tag in accordance with an exemplary embodiment of the present invention.

Turning now to FIG. 4, an exemplary multi-mode tag 400 is illustrated. The tag 400 is an example of a multi-mode tag that is protocol-compatible both with existing RFID tag standards like ISO-18000-6, EPC and other communication system standards like Bluetooth or IEEE 802.11x. The multi-mode tag 400 is thus able to operate as an active tag, communicating using 802.11x or Bluetooth protocols, and can also operate as a passive or semi-passive tag, communicating using backscatter-modulation of transmitted signals. The multi-mode tag 400 also includes a wake up sensor, sleep circuit and timer to reduce power consumption.

In general, the multi-mode RFID tag 400 includes an RF-Power/Wake-Up block 404 that comprises a passive circuit that accumulates energy on the capacitor $C_{store}$ for later use by the system. The block 404 provides a threshold-based wake-up signal to the protocol processor 414. This signal is derived from a division of the storage capacitor $C_{store}$ voltage by the digital resistor R. Once this derived signal exceeds the reference threshold value Ref, the comparator 411 will trigger a digital signal edge, which in turn interrupts the processor 414 so that it can wake-up.

The digital resistor R has a built in non-volatile memory that stores the last setting. The first setting establishes the wake-up threshold. The second setting establishes a proper level for producing a clean ASK signal for decoding. Once awakened, the protocol processor 414 adjusts the digital resistor value to the ASK setting in order to decode RFID reader signals. When finished processing, the RFID command sequence, the processor 414 restores the wake-up threshold setting to the digital resistor.

The listen transistor 410 enables or disables both the wake-up threshold and the ASK demodulation functions. The processor disables the wake-up circuit by turning off this transistor when that function is no longer needed during operation, or during 802.11x/Bluetooth sleep modes. For example, when the tag is in 802.11x or Bluetooth sleep modes, the application may not desire frequent asynchronous wake-ups due to spurious RF or nearby RFID activity.

Asynchronous wake-up is important for situations when the tag should awake immediately once interrogated by an RFID hand-held reader or portal that detects its physical movement into or out of a facility. Also, some applications may require that the tag report its status via the wireless network (via 802.11x or Bluetooth) only when the tag moves through certain checkpoints/portals having RFID interrogators, and then go back to sleep mode at all other times.

The "regulator/charger" block 424 will also utilize the energy stored on the capacitor $C_{store}$ to trickle charge the battery 426 each time a reader illuminates the tag with RF energy, such as when it or a nearby tag is being interrogated. Tags may also be recharged in this manner by placing it in a charging cradle that couples RF energy to the passive wake-up circuit and disabling the wake-up function via the "listen" transistor 410.

The "backscatter switch" 406 allows the tag to operate in both passive and semi-passive modes. The tag 400 may be operated in passive mode when the on-board battery is depleted. That is, when an RFID reader applies CW RF energy to the tag, the passive "RF-Power/Wake-up" circuit 404 rectifies this energy and stores it onto the storage capacitor 408. The charge regulator 424 is then able to supply stabilized power to the processor 414. The RFID reader then supplies ASK modulation to command the processor to switch to RFID protocol mode. The tag responds via backscatter modulation. If the battery is not dead, then the reader is able to communicate with the tag 400 in semi-passive RFID mode from an even greater distance (where the passive circuit cannot collect enough energy to power up the tag.) The tag 400 thus consumes significantly less energy in the backscatter mode compared with the active mode.

The separate 802.11x/Bluetooth transceiver 428 is preferably a stand-alone circuit block such as those that are available from a variety of suppliers. The transceiver 428 provides complete 802.11x and/or Bluetooth functionality. The protocol processor 414 serves as a host processor to manage the administrative and data transfer functions of this transceiver block 428 when the 802.11x/Bluetooth modes are enabled.

The shared non-volatile memory 452 serves as a common repository for system data that can be communicated between RFID, WLAN, and WWAN networks. For example, the tag's IP address can be stored in this memory. The RFID reader with WWAN, WLAN, or wired-LAN connectivity serves as the network connection point for the tag 400 at the time that it is being read. Therefore, the application can treat a multi-mode tag 400 as being connected to a larger area network-whenever an RFID reader is reading it. This connection is separate from the tag's own small area network connection (WLAN or WPAN) via the built in 802.11x or Bluetooth transceivers.

One advantage of the tag 400 is the ability to update to new standards by downloading the new standards to the protocol processor 414 and the non-volatile memory 452 via the 802.11x or Bluetooth network interfaces.

The protocol processor 414 has a built in timer 451 that keeps a real-time clock. This processor 414 can be connected to its own low frequency crystal in order to maintain accurate time while consuming less than 1 mW of power during sleep mode. Therefore, when operating in one of the power savings mode of either 802.11x or Bluetooth, the network state (timers) can be downloaded into the shared non-volatile memory and the respective transceiver sections can be completely powered down. The lower power real-time clock of the protocol processor 414 will subsequently track the network timers while it is off-line. Just before it is time to awake, the protocol processor 414 will power up the transceiver 428 and upload the time-advanced network timers. This entirely bypasses the relatively high power sleep mode of conventional 802.11x or Bluetooth transceivers. For example, while in sleep mode, most commercially available 802.11x transceivers consume about 30 mW of power. Therefore, this auxiliary sleep circuit concept can achieve orders of magnitude reduction in the overall tag power consumption without disrupting the normal operation of either network connection.

More information on multi-mode tags can be found at U.S. patent entitled "An RFID Device, System and Method of Operation Including a Hybrid Backscatter-Based RFID Tag Protocol Compatible with RFID, Bluetooth, and/or IEEE 802.11x Infrastructure" by Raj Bridgelall, Ser. No. 10/290,339, filed on Nov. 8, 2002 and assigned to Symbol Technologies Inc.

Again, this is just one example of the type of multi-mode tag that can be used to implement the object location system and method. For example, a multi-mode tag can use additional or different transmission protocols in active modes. As two specific examples, multi-mode tags can instead use Zigbee ™ or UWB as viable active modes to facilitate general object location.

Figure 5:
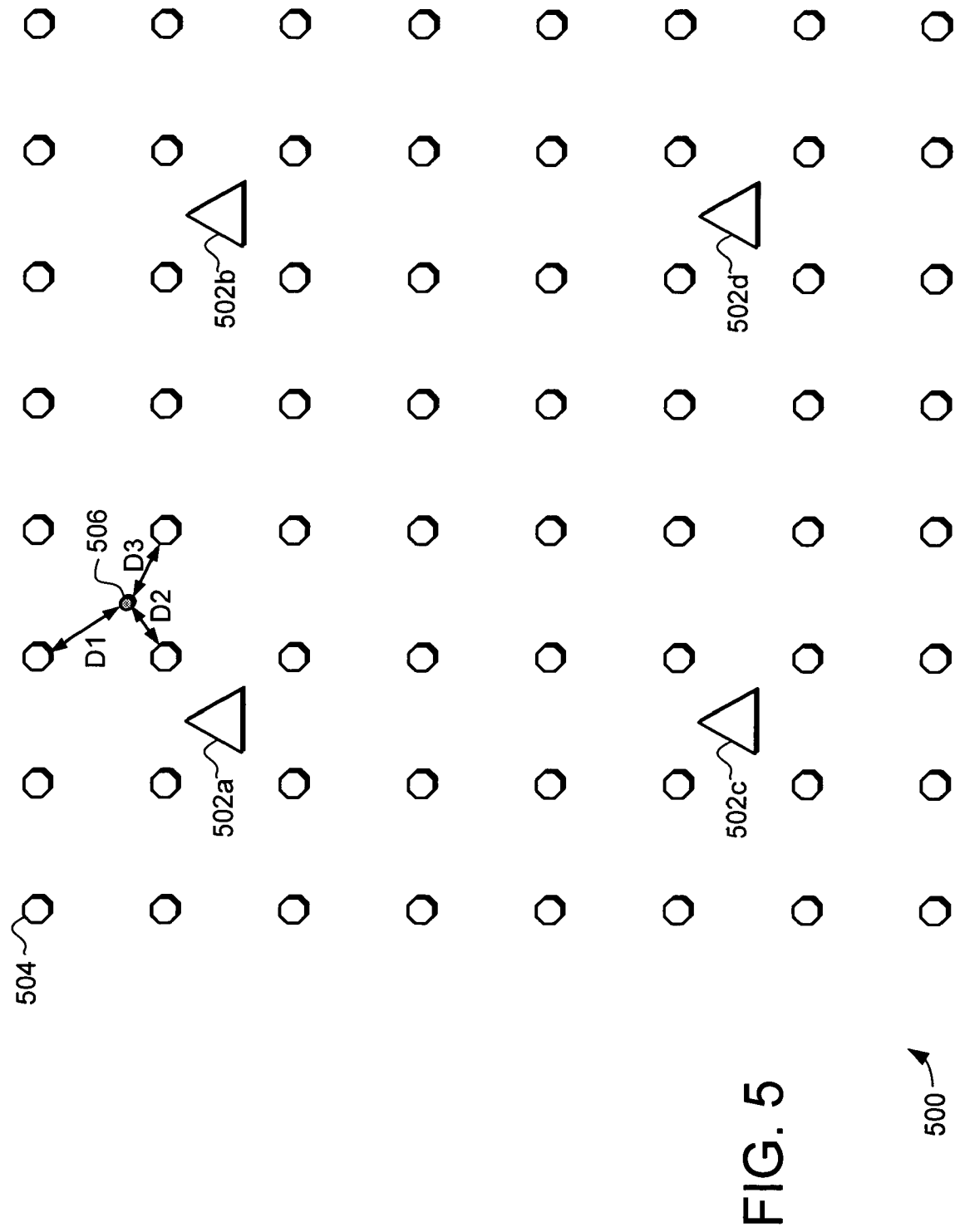
FIG. 5 is a schematic diagram of an array of object locators and RFID readers in accordance with an exemplary embodiment of the present invention.

Turning now to FIG. 5, an object location system 500 is illustrated in accordance with an exemplary embodiment of the present invention. In this example, object location system includes an array of long range transmitters 502 and array of RFID readers 504. The long range transmitters 502 are used to determine the general location of the object, and then the RFID readers 504 are used to determine a more accurate location of the object. The long range transmitters 502 can comprise any suitable type of transmitter, such as WLAN transmitters used for 802.11x compatible devices or Bluetooth transmitters. The transmissions from the long-range transmitters 502 are used to determine the general location of an object using a suitable technique, such as RSSI, TDOA or AOA. With the general location of the object located, the array of RFID readers 504 is used to determine the more accurate location. Specifically, with the general location of the object determined, the system determines the RFID reader(s) that are potentially within the range of the object. Those readers are then used to interrogate the RFID tag on the object and determine the more accurate location. Specifically, each reader 504 in the array is used to determine the distance from the reader to a selected object that includes an RFID tag.

The multi-resolution object location system 500 is able to provide both a long range location of objects and a precise location of objects. Additionally, the multi-resolution object location system 500 can reduce the time required to locate objects and minimize interference by not requiring that all RFID readers 504 in the area be used determine object location. Specifically, determining the general location first using the transmitters 502 minimizes the number of RFID readers 504 that need to be used to precisely locate an object, and thus reduces the number of transmissions from RFID readers 504. This reduces the probability of interference between RFID readers 504 and can also reduce bandwidth and other networking requirements for communicating to the RFID readers 504. Second, the system 500 is able to locate an object relatively quickly as compared to a system that attempts to minimize interference by instead serially allocating different time periods to different RFID readers. Finally, the object location system 500 can at least generally locate objects even when they are unable to be located by the RFID readers, such as in the case of a reader failure, or in the case of object location being out of range of all RFID readers. The multi-resolution object location system 500 can thus efficiently provide accurate object location over a relatively large area.

As illustrated in FIG. 5, the long range transmitters 502 and the RFID readers 504 would typically be spread throughout an area or facility for which object location is desired. For example, devices can be spaced in the ceilings or floors of a large warehouse and used to locate objects within the warehouse. The distance between devices would depend upon the range of the devices and the required coverage.

The distances from at least three of the RFID readers 504, and the known positions of those readers, can be used to trilaterate and determine a highly accurate location of the selected object. Again, the array of RFID readers transmits a plurality of signals to the RFID tag. Specifically, each RFID reader transmits a plurality of signals having different fundamental frequencies than at least one signal transmitted by that reader. It should be noted the fundamental frequencies of transmitted signals from different RFID readers could have the same frequencies, as they are not typically directly compared.

In response to the signals transmitted by each reader, the RFID tag produces a plurality of backscatter-modulated signals that are received by the array of RFID readers. The distance between an RFID reader and the RFID tag is calculated using the measured phase of the backscatter-modulated signals that are received by that RFID reader, and the corresponding fundamental frequencies for the signals originally transmitted by that reader. Specifically, the change in phase with respect to the change in the frequency is used with equation 1 described above to calculate the difference. Preferably, multiple signals are transmitted and backscatter modulated to each RFID reader until the change in phase with respect to the change in fundamental frequency can be calculated within a specified confidence level. As one example, a linear trend of phase change with respect to fundamental frequency change can be determined by performing a least squares fit analysis of the multiple phase measurements and the corresponding fundamental frequencies. This linear trend is a more accurate "estimated slope" of the phase change versus the frequency change. As the number of the measurements increases, the accuracy of the estimated slope and the calculated distance increases. This process can be continued until the least squares fit generates an estimated slope that is within a desired confidence level, where the confidence level can be calculated using any suitable technique such as "goodness of fit" or any other method of assessing the variance of the data trend from a straight line. This process is then continued until the distance from each reader within range of the tag is known at the desired confidence level.

When the distance from the tag to each RFID reader is calculated, the location of the object can be determined using these distances, the known locations of the readers, and a suitable trilateration technique. In the example illustrated in FIG. 5, the distances D1, D2 and D3 between object 506 and three readers can be calculated and used to determine the location of the object relative to the known locations of those readers. Three distance measurements are generally sufficient to trilaterate the position of an object, although additional measurements from other readers within range of the object can be used to provide additional accuracy. Furthermore, as few as one or two readers can be used, although with only one or two readers generating distance measurements, the location of the object cannot be completely disambiguated.

It should be noted that while the illustrated embodiment shows the readers a separate devices, they can in fact share common elements with each other and with the long range transmitters. As one example, one or more RFID readers can be combined with the long distance transmitter. As another example, multiple RFID readers can share one RFID transceiver by coupling multiple distributed antennas to the one transceiver. Thus, instead of providing a separate RFID transceiver for each antenna, a switch is used selectively connect the antennas to a single RFID transceiver. This approach provides the ability to reduce cost in some applications and minimize interference between RFID readers. It should be noted that in other applications separate transceivers may be desirable and more cost efficient, depending primarily on the relative cost of the separate transceivers versus cost of separate antennas and cabling.

In systems such as those illustrated in FIG. 5, it is desirable to compensate for cable differences and other connection lengths to minimize the effect on the measured phases. This calibration can be done by either measuring the distance to a known tag location relative to the RFID reader, or by switching the antenna to a known backscatter reference and setting that distance to zero.

In addition to using fixed long-range transmitters and RFID readers, the system and method can also be applied to mobile devices. Mobile RFID readers, including battery powered hand-held devices, can be used in a variety of different embodiments. In some embodiments, the mobile RFID reader is used to selectively activate RFID tags and determine the distance to the RFID tag using the methods described above. Additionally, by determining the location of the mobile reader itself, the mobile reader's distance measurements can be combined with other measurements from other readers to trilaterate the location of the object. Furthermore, the mobile unit itself can be used to take multiple distance measurements from different locations that in turn can be used to trilaterate the location of the object. Knowing the location of the mobile RFID reader can also be used by the system to selectively activate only those other RFID readers that are within the area of the mobile RFID reader, and thus reduce the potential for signal interference.

The mobile RFID reader can also include mechanisms to perform general object location, such as appropriate 802.11x or Bluetooth transmitters. Such a mobile RFID reader is able to first perform a general location determination using a suitable method and then, as the mobile RFID reader moves within range, use RFID backscatter-modulated signals to accurately determine the objects location. Additionally, it may be desirable to add additional identification capabilities to the mobile RFID reader. For example, adding bar-code or other symbol reading ability can be used to identify specific items from a group of items that are too close to distinguish by their distances. Thus, the mobile reader can scan objects in the area guided to by the RFID signals until a specific desired object is located.

In many cases it will be desirable to provide a mechanism for locating the mobile RFID reader itself. As mentioned above, when the location of the mobile RFID reader itself is known, the distance measurements from the mobile RFID reader to the object can be combined with distance measurements from other RFID readers to trilaterate the location of the object. As another example, multiple measurements from made by one mobile RFID reader from different known locations could also be combined to trilaterate the location of the object.

A variety of different techniques can be used as mechanisms for locating the mobile RFID reader. As one example, where the mobile RFID reader communicates with a computer system using 802.11x or other suitable protocols, those same communication transmissions can be used to locate the mobile RFID reader. As another example, the mobile RFID reader can use distance measurements to RFID tags to determine its own location. For example, using the techniques described above, the mobile RFID reader can determine the distances to a plurality of RFID tags placed at known locations throughout an area. From those distances, the mobile RFID reader can determine its own location within the area. As a third example, the mobile RFID reader can itself include an RFID tag (e.g., an actual RFID tag or circuitry to emulate an RFID tag), with that RFID tag being used to determine the location of the mobile RFID reader.

Figure 6:
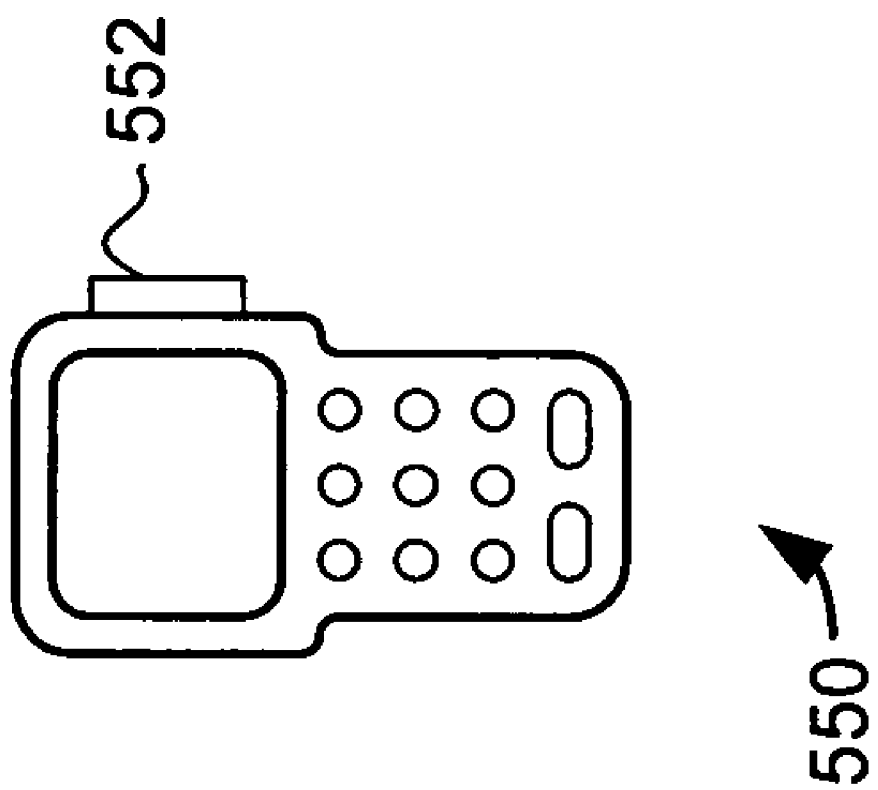
FIG. 6 is top view of an exemplary mobile RFID reader in accordance with an exemplary embodiment of the present invention.

Turning now to FIG. 6, an exemplary mobile RFID reader 550 is illustrated. The mobile RFID reader 550 is exemplary of the type of mobile readers that can be adapted for use to locate objects using the system and method described above. The mobile RFID reader 550 is thus used to determine the location of objects that include an RFID tag. To facilitate this, the RFID reader 550 includes an RFID tag 552. The RFID tag 552 on the mobile RFID reader 550 can be used determine the location of the mobile RFID reader 550. Specifically, other RFID readers can transmit a plurality of signals to the RFID tag 552 and use the backscatter-modulated signals from the RFID rag 552 to determine the location of the mobile RFID reader. Furthermore, if the RFID tag 552 is a multi-mode tag, the general location of the mobile reader 550 can be determined using the long range techniques such as RSSI and TDOA.

In another embodiment, the mobile reader itself communicates with a computer system using a suitable protocol such as 802.11x or Bluetooth and those communication transmissions are also used to determine the general location of the mobile RFID reader 550. Thus, the general location of the mobile reader 550 can be determined using its own communication signals and then a more accurate location determined using a RFID backscatter-modulated signals of the RFID tag 552.

With the position of the mobile RFID reader 550 determined, the mobile RFID reader 550 can be used as one of an array of RFID readers to accurately determine the location of an object that includes another RFID tag. It should be noted the RFID tag on the mobile reader could be implemented by emulating the behavior of a tag using an antenna, transistor, rectifier and the existing microprocessor on the mobile reader. In this example, the transistor is driven by the microprocessor to create backscatter modulation that imitates a conventional RFID tag.

In many cases it may be desirable for the RFID reader 550 to also function as part of the long range location system. In these cases, the RFID reader would also be able to communicate with other devices (such as multi-mode tags using 802.11x) and use RSSI, TDOA, or other suitable methods to determine the general location of an object. With the general location determined the RFID reader 550 can more precisely locate the objects using RFID backscatter modulation.

Additionally, it may be desirable to add additional identification capabilities to the mobile RFID reader. For example, adding bar-code or other symbol reading ability can be used to identify specific items from a group of items that are too close to distinguish by their distances.

Thus, in one embodiment a mobile RFID reader can use long range transmissions such as 802.11x or Bluetooth to determine the general location of the object, and then use RFID backscatter-modulation to determine a more accurate location of the object. As the mobile reader moves closer to the object, the signal strength would improve and distance calculation based on RFID backscatter modulation would become more and more accurate. Finally, when in the mobile RFID reader is in the immediate area of the object, the mobile RFID reader can then use a barcode or other reader technology to scan objects in the immediate area until the specific desired object is located.

As discussed above, the RFID reader transmits a plurality of signals to the RFID tag on the object that is to be located, with the signals selected to have different fundamental frequencies. Again, to implement signals with a plurality of different frequencies only a least one transmitted signal with a fundamental frequency different from at least one other transmitted signal is needed. Furthermore, it should be noted that that nothing prevents the utilization of additional transmitted signals that have the same frequency as other transmitted signals. In general however, transmitting more signals with new frequencies will be desirable to improve the accuracy of the system.

Several different methods and procedures can be used in selecting the frequencies of the plurality of transmitted signals. One significant factor is the regulatory constraints imposed on the system. For example, in some regulatory systems it will be desirable to base frequency selection on channel availability. In another example, frequency selection can be randomly selected.

Specifically, in certain bands such as 915 MHz and 2.45 MHz ISM bands, the FCC and other regulatory agencies allow up to 4 watts of transmitted power if suitable spread spectrum techniques are employed. The object location system can be implemented to randomly select transmission frequencies (i.e., channels) within one or more frequency bands and thus meet the requirements of a spread spectrum system. By randomly selecting frequencies and otherwise complying with the regulatory framework, the object location system can thus transmit to the higher power level allowed such systems. Transmitting at higher power levels increasing the effective range of the system and thus the overall performance of the system.

As another example, other regulatory bodies such as CEPT in Europe specify the use of "listen before transmit" procedures instead of random hopping used in spread spectrum. In such a system, the transmitter listens for transmissions at a frequency channel before making its own transmission in that channel. If the transmitter detects activity in that channel, the transmitter will switch to the next frequency channel. There it will again listen to detect other transmissions before transmitting itself. This process is continued until an available channel is found and the transmission is made in that available channel. A variety of different channel selection algorithms are available to implement such a system based on sensing channel occupation or the traditional carrier sense multiple access (CSMA) methods. In any event, the object location system can select transmission frequencies using the "listen before transmit" procedure in such a way that it is most compatible with the regulatory framework for which the system is designed to operate. Without the ability to use such a channel selection algorithm the object location system would be limited in the power that can be used in transmitting to the RFID tag, resulting in less range and accuracy for the system.

Figure 7:
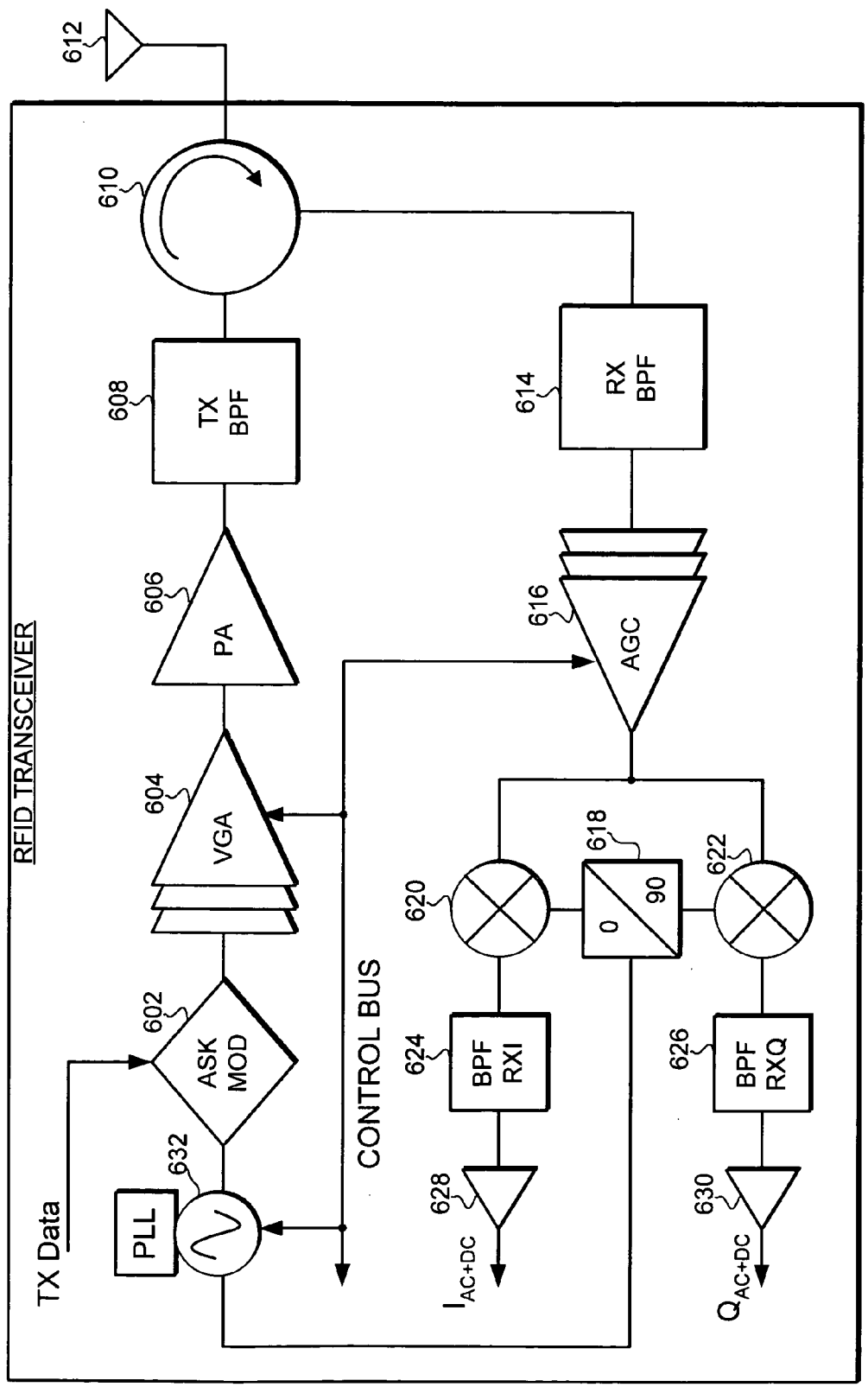
FIG. 7 is a schematic view an exemplary RFID transceiver in accordance with an exemplary embodiment of the present invention.

Turning now to FIG. 7, a RFID transceiver 600 is illustrated in accordance with an exemplary embodiment of the present invention. The RFID transceiver 600 is an example of the type of RFID transceiver that can be used in RFID reader(s) in the object location system and method. The RFID transceiver 600 is designed to transmit and receive signals to and from a selected RFID tag. Furthermore, the RFID transceiver 600 includes a quadrature demodulator. Quadrature demodulators are typically used in quadrature amplitude modulation (QAM) systems that combine two amplitude-modulated signals into a single channel, with two carriers ("I" and "Q") having the same fundamental frequency but differing in phase, typically by 90 degrees. In quadrature demodulation, the two carriers are separated, and the data is extracted from each, and then the data is combined into the original modulating information. The RFID transceiver 600 uses a quadrature demodulator to provide a mechanism for determining the phase of the received backscatter-modulated signal relative to the transmitted signal. Specifically, the AC amplitudes of the separately demodulated "I" and "Q" channels will be used to determine the relative phase of the received backscattered signal. Of course, this is just one example, and other transceiver implementations could be used with other demodulation techniques.

The RFID transceiver 600 includes a modulator 602, a variable gain amplifier 604, a power amplifier 606, a band-pass filter 608, a circulator 610, a band pass filter 614, an automatic gain control 616, demodulators 620 and 622, band pass filters 624 and 626, buffers 628 and 630, and phase-locked-loop oscillator 632. The transceiver 600 transmits signals and receives signals through the antenna 612. Of course, additional antennas could be added using a switch as was described with reference to FIG. 4 above.

In general the transceiver 600 transmits to and receives signals from selected RFID tags that are in the responsive mode. To transmit data, the transceiver encodes transmission data onto a carrier waveform generated by oscillator 632 and broadcasts the signal through the antenna 612 to the RFID tag. Specifically, to transmit data the transceiver 600 uses the modulator 602 and the variable gain amplifier 604 to modulate the carrier signal generated by oscillator 632 with the transmission data (TX Data). The power amplifier 606 amplifies the modulated signal, which is passed through band pass filter 608. The circulator 610 acts as a selective coupler element to antenna 612, where the modulated signal is transmitted to the RFID tags, and substantially isolated from the directly connected receiver.

To receive data from the tag, the transmitter ceases carrier modulation and the receiver receives the modulated backscattered signal via the antenna, strips the signal from the carrier signal, and converts the stripped signal into an in phase "I" component and a quadrature "Q" component. These components can then be independently digitized and sent to a processor for bit recovery, where they can be interpreted by the RFID reader and/or other related systems. Additionally, these components can be used to determine the phase of the received signal relative to the originally transmitted signal, with the phase of the originally transmitted signal serving as a reference measurement to determine the change in phase between the different received signals.

Specifically, the transceiver 600 receives backscatter-modulated signals from the RFID tag via antenna 612. The circulator 610 again acts as a selective coupler element, this time coupling the antenna 612 to the band pass filter 614. The received signal may then be amplified by the automatic gain control 616. This amplified signal may then be carrier-demodulated in quadrature using mixers 620 and 622 and phase shifter 618, which collectively provide two demodulators. This demodulation results in an in-phase signal $I_{AC+DC}$ and the quadrature signal $Q_{AC+DC}$. Each of these signals is passed through a corresponding band-pass-filter (624 and 626) and buffers (628 and 630) before the separate signals are further processed.

It should be noted that in this embodiment the demodulator uses the same signal generated by the phase-lock-loop oscillator 632 that is used for carrier generation of the originally transmitted signal. As such, the phase of this signal can serve as a reference by which the phase change of the received signals can be measured. Specifically, by determining the phase for multiple received signals with respect to the carrier signal, the relative change in phase between those received signals can be calculated. Thus, determining the phase difference of the received backscatter-modulated signal compared to the originally transmitted signals provides a mechanism for determining the rate of change in the phase of the plurality of backscatter-modulated signals.

Again, this is just one example of an RFID receiver that can be used for object location. For example, other suitable receivers use separate transmit and receiver configurations. Yet other suitable receivers replace the circulator component with a directional coupler. The advantage of a directional coupler is much lower cost and smaller size but the disadvantage is significant signal loss, hence much lower performance.

It also should be noted that in many cases the transmissions received by the antenna would include significant noise and other error components. To minimize such errors it may be desirable to use various error cancellation techniques. Examples of suitable error cancellation techniques are found in the patent application entitled "Full-Duplex Radio Frequency Echo Cancellation" by Mark Duron and Raj Bridgelall, filed Oct. 21, 2003, Ser. No. 10/690,390 and assigned to Symbol Technologies Inc.

With backscattered signals from the RFID tag demodulated, the phase can be determined and used to calculate the distance to the object. As described above, the distance calculator determines the phase in the plurality of backscatter-modulated signals that were received by the RFID reader. From the change in phase and the corresponding change in fundamental frequency in the originally transmitted signals, the distance calculator calculates the distance to the RFID tag using equation 1. The phase differences can then be determined using a variety of different techniques and devices. As one example, the phase of each backscattered signal is referenced to the phase of the originally transmitted signal.

One method for determining the phase of the received signals is to measure the AC amplitude of both I and Q channels and use those measurements to determine the phase angle. That is, the peak-to-peak AC amplitude of the I and Q channel can be averaged over some predetermined time period. The relative phase $\Phi$ of the received signal as compared to the carrier phase can be determined as:

$$\Phi = \arctan\frac{Q_{amp}}{I_{amp}}. \tag{2}$$

Where $Q_{AMP}$ is the average AC amplitude in the Q channel and $I_{AMP}$ is the average AC amplitude in the I channel. With the relative phase $\Phi$ of multiple backscatter-modulated signals calculated, the phase change between those signals can be calculated and used with the corresponding fundamental frequencies of the transmitted signals to determine the distance to the tag.

Figure 8:
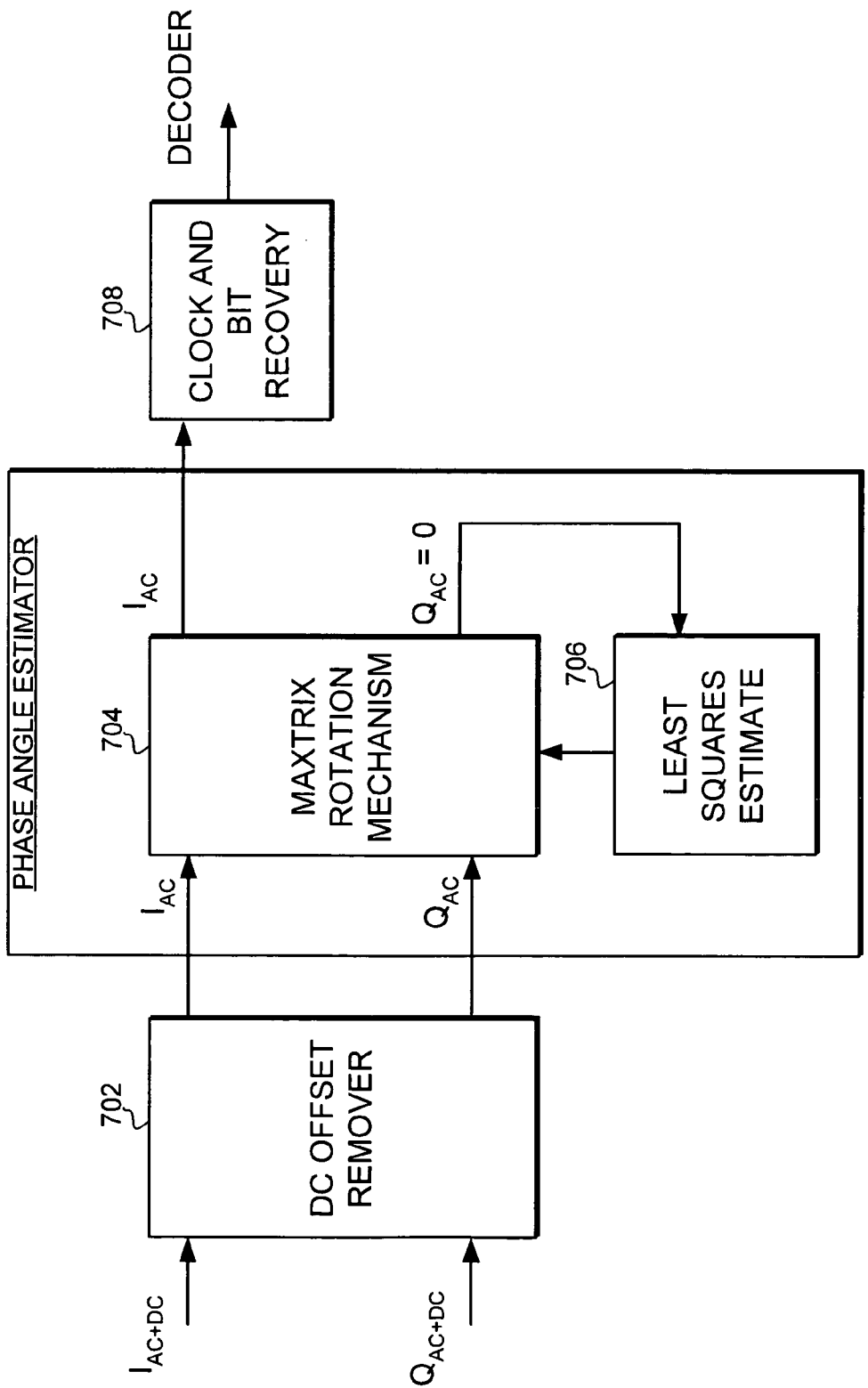
FIG. 8 is a schematic view of an exemplary phase angle estimator in accordance with an exemplary embodiment of the present invention.

Of course, this is just one example of how the phase of the received backscattered signals can be calculated. Turning now to FIG. 8, another exemplary phase angle estimator 700 is illustrated. The phase angle estimator 700 uses the mathematical technique of matrix rotation to determine the phase of the signals. In the illustrated implementation, the I channel signal $I_{AC+DC}$ quadrature signal $Q_{AC+DC}$ are passed to a DC offset remover 702. This removes the DC portion of the I and Q channel signals, leaving only the AC portions of each signal. Additionally, noise rejection can be done at this point as well.

The I channel signal $I_{AC}$ an quadrature signal $Q_{AC}$ are then passed to matrix rotation mechanism 704. The AC amplitudes of these signals are loaded into the matrix. Again, these AC amplitudes can be determined by averaging the AC amplitude over a selected time period. The matrix is then mathematically rotated until the signal in the Q channel is minimized and the signal in the I channel is maximized. The angle of matrix rotation needed to maximize the signal in the I channel is equal to the relative phase of the received signal. In the illustrated example, the minimization of signal in the Q channel is done using a least squares estimate minimization technique. Of course, other suitable techniques could also be used. This method also has the advantage of moving all of the signal to the I channel, where the information in the channel can be recovered and decoded using any suitable technique. Again, with the relative phase of multiple backscattered signals calculated using the phase angle estimator, the phase change between those signals could be calculated and used to determine the distance to the tag.

It should be noted that methods and systems described above for measuring the phase angle of signals cannot always completely disambiguate the phase of a received signals. Specifically, using the arctangent of the amplitudes will always generate a result of between 0 and $2\pi$ radians, when in fact the actual phase can be much greater than $2\pi$. In general, the original measured phase values are referred to as "wrapped", and the process of determining the actual, nominal phase values from the wrapped values is called "phase unwrapping".

Thus, phase unwrapping is a technique that can be used to determine the nominal phase change over a linear span of corresponding fundamental frequencies. One method of phase unwrapping is to linearize the phase shift from the wrapped values. Specifically, the phase unwrapping is accomplished by adding or subtracting multiples of $2\pi$ until the phase measurement in question shows a consistent trend over a frequency span.

As one example of unwrapping, when a set of monotonically increasing fundamental frequencies are used, a monotonic set of phase measurements should result after accounting for any noise. For particular phase measurements that do not follow the monotonic trend, they can be unwrapped by adding or subtracting multiples of $2\pi$ until they show a linear trend over a linear frequency span. A variety of different phase unwrapping algorithms are available that can be adapted for this use, such as signal processing tools available in MATLAB.

Turning now to FIG. 9, a table 800 illustrates an exemplary data set from which the distance to an RFID tag can be determined using an exemplary embodiment of the present invention. Specifically, the table 800 lists 14 transmitted signal fundamental frequencies and a corresponding 14 measured relative phase measurements. It should first be noted that this is just one example data set, and that typical data sets could include more or less data points. It should also be noted that while example data set shows equal distances between fundamental frequencies, that this will not be the case in many applications.

In the example of table 800, the frequency order of the transmitted signals was randomly selected. Again, when random frequency hopping is used the system operates as spread spectrum system and can transmit with increased power under current regulations. Again, this is just one example, and in other cases different frequency hopping procedures can be used.

The phase measurements illustrated in table 800 are wrapped, again meaning that the phase measurements are limited to values between zero and $2\pi$ radians. These values thus do not represent the actual relative phase values, and to accurately calculate the distance it is desirable to unwrap the phase measurements. Turning now to FIG. 10, a table 900 lists the 14 transmitted signal fundamental frequencies in order of fundamental frequency and a corresponding unwrapped 14 measured relative phases. These unwrapped phase values correspond to the actual relative phase of the received backscatter-modulated signals. Again, these unwrapped phase values can be determined by a variety of phase unwrapping techniques, such as adding multiples of $2\pi$ until a consistent linear phase trend is recovered.

Figure 11:
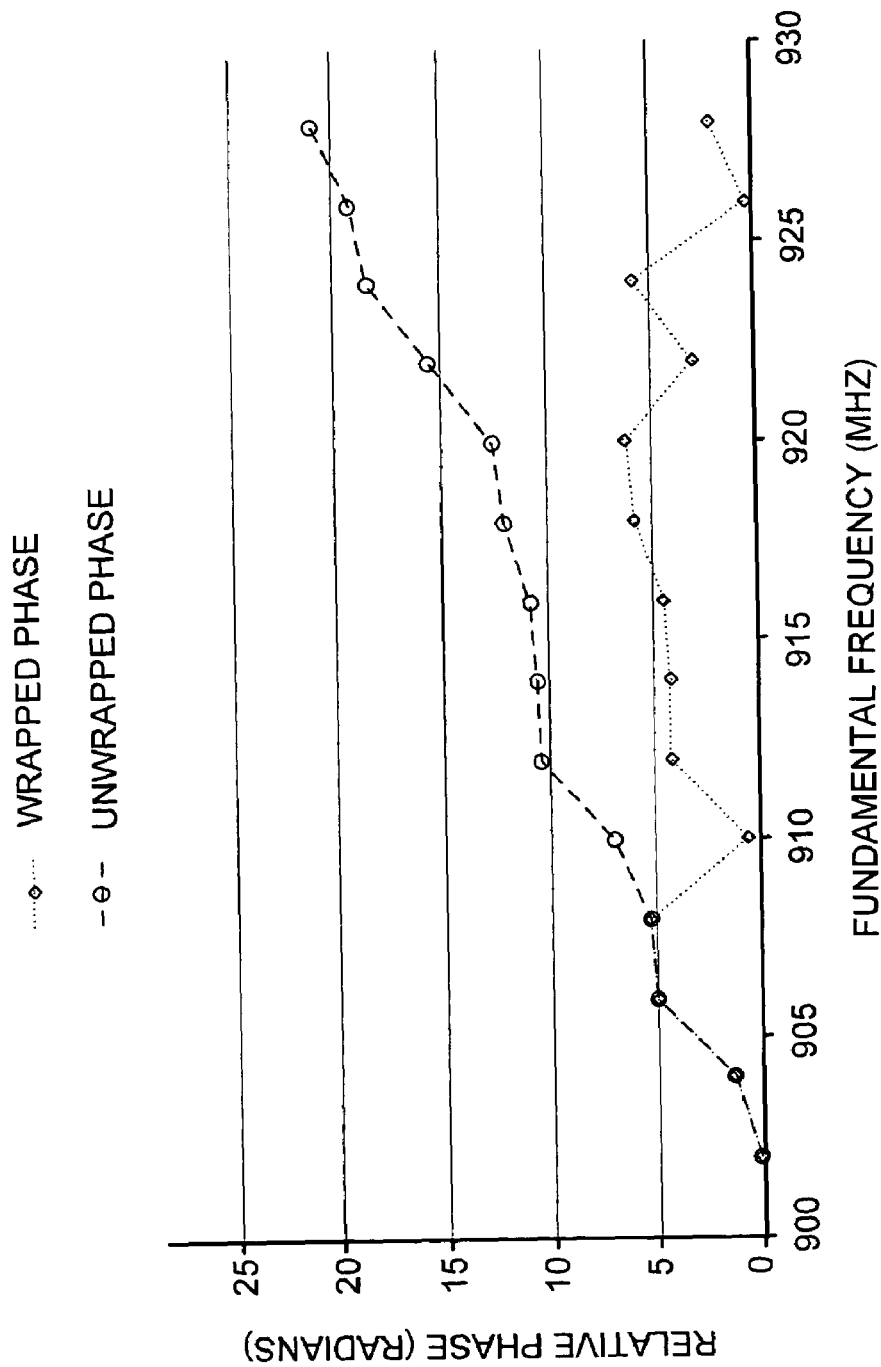
FIGS. 11 and 12 are graph views of an exemplary data set in accordance with an exemplary embodiment of the present invention.

Turning now to FIG. 11, a graph 1000 illustrates the wrapped phase measurements and the unwrapped phase measurements of tables 800 and 900. As can be seen, the unwrapping of phase measurements results in phase measurements that follow a consistent trend. Using phase unwrapping techniques, the underlying phase can be determined even in the presence of significant noise and multi-reflections.

Figure 12:
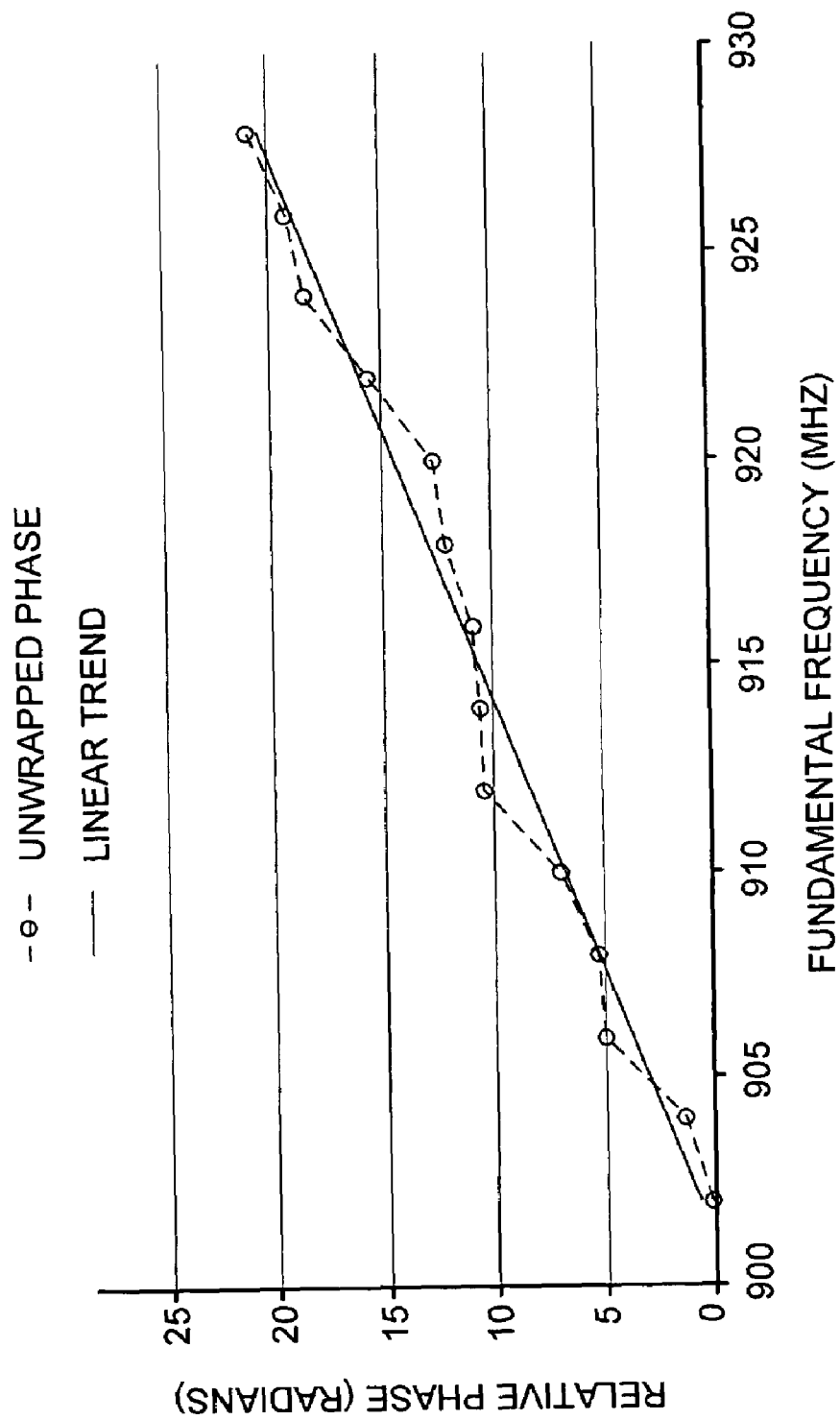

With the unwrapped phase measurements determined, the distance can be determined by calculating the rate of change of the phase with respect to the rate of change of the fundamental frequency. As one example, a linear trend fit of the unwrapped phase measurements the fundamental frequencies can be performed to determine the rate of change. Turning now to FIG. 12, a graph 1100 illustrates the unwrapped phase measurements of table 900 and graph 1000 along with an exemplary linear trend calculated from the phase measurements. The linear trend can be calculated from the data using a variety of techniques such as least squares fit. When calculated the linear trend gives a more accurate calculation of the phase change with respect to the frequency change in the form of the slope of the trend fit line. In the illustrated example, the slope of the linear trend is 9.01E-07 radians/hertz. When calculated, the slope of the linear trend fit line can be used as $\Delta\phi/\Delta f$ in equation 1 to calculate the distance. In this example, using the slope of the linear trend fit line in equation 1 gives a distance measurement of 21.4 meters. Thus, the linear fit method is able to overcome noise in the data such as noise created by multi-path reflections, interference and non-coherent transmissions. Again, this is just one specific example of how a linear trend fit can be used to determine the rate of change of the phase and frequency to calculate the distance to an object with an RFID tag.

The present invention thus provides a multi-resolution object location system and method for locating objects. The multi-resolution system and method uses a long-range object locator together with a more precise RFID locator to efficiently and accurately determine the location of objects that include an RFID tag. The long-range object locator has a relatively longer range and can cover a relatively large area to determine the general location of the object within the large area. The RFID locator has a relatively shorter range, but is able to locate the object more precisely. The object location system uses the long-range locator to first determine the general location of the object, and then the RFID locator is used to determine a more accurate location of the object. Thus, the multi-resolution object location system is able to provide both a long range location of objects over a large area and a precise location of objects. The multi-resolution object location system and method can thus efficiently provide accurate object location over a large area.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An object location system for locating an object having an RFID tag, the object location system comprising:
   an object locator, the object locator receiving at least one transmission from the object and determining a general location of the object from the at least one transmission;
   an RFID reader, the RFID reader transmitting a plurality of transmitted signals to the RFID tag and receiving a plurality of backscatter-modulated signals from the RFID tag, at least two of the plurality of transmitted signals having a different fundamental frequency; and
   a distance calculator, the distance calculator determining a phase for each of the plurality of backscatter-modulated signals from the RFID tag, the distance calculator determining a distance to the RFID tag by determining a rate of change of the phase in the plurality of backscatter-modulated signals with respect to rate of change in the fundamental frequency of the plurality of transmitted signals.

2. The system of claim 1 wherein the object locator determines the general location of the object using received signal strength of the at least one transmission.

3. The system of claim 1 wherein the object locator determines the general location of the object using time difference of arrival of the at least one transmission.

4. The system of claim 1 wherein the object locator determines the general location of the object using angle of arrival of the at least one transmission.

5. The system of claim 1 wherein the object locator includes an 802.11x transceiver.

6. The system of claim 1 wherein the object locator includes a Bluetooth transceiver.

7. The system of claim 1 wherein the object locator includes a WWAN transceiver.

8. The system of claim 1 wherein the RFID tag comprises a multi-mode RFID tag, and wherein the at least one transmission originates from the multi-mode RFID tag.

9. The system of claim 8 wherein the multi-mode RFID tag transmits using an 802.11x protocol transmission in an active mode, and wherein the object locator uses the 802.11x protocol transmission to determine the general location of the object.

10. The system of claim 8 wherein the multi-mode RFID tag transmits using a Bluetooth protocol transmission in an active mode, and wherein the object locator uses the Bluetooth protocol transmission to determine the general location of the object.

11. The system of claim 1 wherein the RFID reader comprises a mobile reader.

12. The system of claim 11 wherein the mobile RFID reader includes a mobile RFID reader RFID tag and wherein the mobile RFID reader tag is utilized to determine a location of the mobile RFID reader.

13. The system of claim 11 wherein the mobile RFID reader transmits to a known location RFID tag to determine a location of the mobile RFID reader.

14. The system of claim 11 wherein the mobile RFID reader communicates using an 802.11x protocol transmission and wherein the object location system uses an 802.11x protocol transmission to determine the general location of the object.

15. The system of claim 11 wherein the mobile RFID reader communicates using an 802.11x protocol transmission and wherein the 802.11x protocol transmission is used to determine a location of the mobile RFID reader.

16. The system of claim 11 wherein the mobile RFID reader communicates using a Bluetooth protocol transmission and wherein the object location system uses the Bluetooth protocol transmission to determine the general location of the object.

17. The system of claim 11 wherein the mobile RFID reader communicates using a Bluetooth protocol transmission and wherein the Bluetooth protocol transmission is used to determine a location of the mobile RFID reader.

18. The system of claim 11 wherein the mobile RFID reader includes a bar-code reader to identify the object from a group of nearby objects.

19. The system of claim 1 wherein the RFID reader continues to transmit additional transmitted signals and receive additional backscatter-modulated signals and wherein the distance calculator continues to determine a phase for each of the additional backscatter-modulated signals received and uses the phase for each additional backscatter-modulated signal to determine the distance from the RFID reader to the RFID tag is until the distance is computed within a specified level of accuracy.

20. The system of claim 1 wherein the rate of change of the phase in the plurality of backscatter-modulated signals with respect to a rate of change in the fundamental frequency of the plurality of transmitted signals is determined by performing a linear trend fit of the phase in the plurality of backscatter-modulated signals versus the fundamental frequency of the plurality of transmitted signals.

21. The system of claim 1 wherein the at least two of the plurality of transmitted signals having a different fundamental frequency have a randomly selected frequency difference.

22. The system of claim 1 wherein the at least two of the plurality of transmitted signals having a different fundamental frequency have a frequency difference determined by selecting a next available frequency channel using a listen before transmit procedure.

23. A method of locating an object having an RFID tag, the method comprising the steps of:
   determining a general location of the object using at least one transmission from the object;
   transmitting a plurality of transmitted signals from an RFID reader to the RFID tag, the plurality of transmitted signals having a fundamental frequency difference;
   receiving a plurality of backscatter-modulated signals from the RFID tag;
   determining a phase for each of the plurality of backscatter-modulated signals; and
   computing a distance to the RFID tag by determining a rate of change of the phase in the plurality of backscatter-modulated signals with respect to a rate of change in the fundamental frequency of the plurality of transmitted signals.

24. The method of claim 23 wherein the step of determining a general location of the object comprises using received signal strength of transmissions.

25. The method of claim 23 wherein the step of determining a general location of the object comprises using time difference of arrival of transmissions.

26. The method of claim 23 wherein the step of determining a general location of the object comprises using angle of arrival of transmissions.

27. The method of claim 23 wherein the step of determining a general location of the object comprises using 802.11x transmissions.

28. The method of claim 23 wherein the step of determining a general location of the object comprises using Bluetooth transmissions.

29. The method of claim 23 wherein the step of determining a general location of the object comprises using WWAN transmissions.

30. The method of claim 23 wherein the RFID tag comprises a multi-mode RFID tag.

31. The method of claim 30 wherein the multi-mode RFID tag transmits using an 802.11x protocol transmission in an active mode, and wherein the step of determining a general location of the object using at least one transmission from the object comprises using an 802.11x protocol transmission from the multi-mode RFID tag to determine the general location of the object.

32. The method of claim 30 wherein the multi-mode RFID tag transmits using a Bluetooth protocol transmission in an active mode, and wherein the step of determining a general location of the object using at least one transmission from the object comprises using a Bluetooth protocol transmission to determine the general location of the object.

33. The method of claim 23 wherein the RFID reader comprises a mobile reader.

34. The method of claim 33 wherein the mobile RFID reader includes a mobile RFID reader RFID tag, and further comprising the step of using the mobile RFID reader tag to determine a location of the mobile RFID reader.

35. The method of claim 33 further comprising the step of transmitting from the mobile RFID reader to a known location RFID tag to determine the location of the mobile RFID.

36. The method of claim 33 wherein the mobile RFID reader comprises communicates using an 802.11x protocol transmission and wherein the step of determining a general location of the object using at least one transmission from the object comprises using an 802.11x protocol transmission is to determine the general location of the object.

37. The method of claim 36 further comprising the step of using an 802.11x protocol transmission to determine a location of the mobile RFID reader.

38. The method of claim 33 wherein the mobile RFID reader comprises communicates using a Bluetooth protocol transmission and wherein the step of determining a general location of the object using at least one transmission from the object comprises using a Bluetooth protocol transmission from the mobile RFID reader to determine the general location of the object.

39. The method of claim 38 further comprising the step of using a Bluetooth protocol transmission to determine a location of the mobile RFID reader.

40. The method of claim 23 wherein the steps of transmitting a plurality of transmitted signals, receiving a plurality of backscatter-modulated signals, and determining a phase in the plurality of backscatter-modulated signals comprises transmitting, receiving and determining a phase for additional transmitted signals and backscatter-modulated signals until the step of computing the distance to the RFID tag determines the distance within a specified level of accuracy.

41. The method of claim 23 wherein the step of computing a distance to the RFID tag by determining a rate of change of the phase in the plurality of backscatter-modulated signals with respect to a rate of change in the fundamental frequency comprises performing a linear trend fit.

42. The method of claim 23 wherein the plurality of transmitted signals have a randomly selected fundamental frequency difference.

43. The method of claim 23 wherein the plurality of transmitted signals have a fundamental frequency difference selected by selecting a next available frequency channel using a listen before transmit procedure.

44. The method of claim 23 wherein the step of computing a distance to the RFID tag by determining a rate of change of the phase in the plurality of backscatter-modulated signals with respect to a rate of change in the fundamental frequency comprises performing a linear trend fit.

45. The method of claim 23 wherein the step of determining a phase for each of the plurality of backscatter-modulated signals comprises unwrapping relative phase difference measurements to result in a substantially linear phase trend.

46. The method of claim 23 wherein the step of transmitting a plurality of transmitted signals from the RFID reader to the RFID tag comprises transmitting from an array of RFID readers, and wherein the step of receiving a plurality of backscatter-modulated signals from the RFID tag comprises receiving the plurality of backscatter-modulated signals at the array of RFID readers, and wherein the step of computing a distance to the RFID tag comprises computing a distance from the RFID tag to each of the array of RFID readers.

47. The method of claim 23 wherein the step computing a distance to the RFID tag by determining a rate of change of the phase in the plurality of backscatter-modulated signals with respect to a rate of change in the fundamental frequency of the plurality of transmitted signals comprises using at least three determined phases and at least three fundamental frequencies to calculate the rate of change.

48. An object location system for locating an object, the object location system comprising:
  an object locator, the object locator receiving at least one transmission from a multi-mode RFID tag operating in an active mode on the object, the object locator determining a general location of the object from the at least one transmission from the multi-mode RFID tag;
  an array of RFID readers distributed around an area, a plurality of the array of RFID readers transmitting at least three transmitted signals to the multi-mode RFID tag, the plurality of the array of readers selected from the array of RFID readers based on the general location of the object, each of the plurality of the array of RFID readers receiving at least three backscatter-modulated signals from the multi-mode RFID tag, wherein the at least three transmitted signals from each RFID reader have a fundamental frequency with a fundamental frequency difference; and
  a distance calculator, the distance calculator determining a phase of the at least three backscatter-modulated signals received at each RFID reader, the distance calculator determining a distance from each RFID reader by performing a linear trend fit of the phase in the at least three backscatter-modulated signals and the fundamental frequency of the at least three transmitted signals to determine a rate of change of the phase with respect to a rate of change of the fundamental frequency.

49. The system of claim 48 wherein at least one of the array of RFID readers comprises a mobile reader.

50. The system of claim 49 wherein the mobile RFID reader includes a mobile RFID reader RFID tag and wherein the mobile RFID reader tag is utilized to determine a location of the mobile RFID reader.

* * * * *